United States Patent
Drummond

(10) Patent No.: US 6,228,249 B1
(45) Date of Patent: May 8, 2001

(54) ELECTROLYTIC PURIFICATION OF CALCIUM CARBONATE

(75) Inventor: Donald Kendall Drummond, Quakertown, PA (US)

(73) Assignee: Minerals Technologies Inc., Bethlehem, PA (US)

( * ) Notice: Subject to any disclaimer, the term of this patent is extended or adjusted under 35 U.S.C. 154(b) by 0 days.

(21) Appl. No.: 09/343,826

(22) Filed: Jun. 30, 1999

(51) Int. Cl.$^7$ .......................................................... C25B 1/18
(52) U.S. Cl. .......................... 205/687; 205/480; 205/770; 423/431
(58) Field of Search ................................... 205/687, 480, 205/770; 423/431

(56) References Cited

PUBLICATIONS

Acar, Y.B., "J of Geotechnical Engineering," vol. 122 No. 3, PP 175–185.
Dudek, F.J.; Daniels, E.J.; Morgan, W.A.; International Symposium on the Extraction and Applications of Zinc and Lead, Sendai, Japan, May 22–24, 1995.
Drummond, D.K.; SMI Patent Application.
Flett, D.S.; Covington, J.W.; Winter, D.G.; Spring 1988 Proceedings of the Electrochemical Society Meeting: vol. 88–1.
Mahanti, H.S., Barnes, R.M.; "Appl. Spectroscopy," 1983. vol. 37, 155.4.
Golley, C.R.L.; European Patent Application 88304211.

*Primary Examiner*—Arun S. Phasge
(74) *Attorney, Agent, or Firm*—Marvin J. Powell; Terry B. Morris

(57) ABSTRACT

The present invention provides an electrochemical process for reducing metal contaminants in calcium carbonate by solubilizing the metal contaminate in an aqueous solution of calcium carbonate and then removing the solubilized metal contaminant by passing an electrical current through the aqueous calcium carbonate solution containing the solubilized metal contaminant. Calcium carbonate produced according to the process of this invention is particularly suitable for use as food or pharmaceutical additives. The calcium carbonate is also suitable for use in papermaking process as fillers, or coatings, or as additives in the production of plastics, paints and adhesive products. Other uses of high purity calcium carbonate include catalysts and catalyst supports, electrical/semiconductor applications, florescent lighting, and optical/laser applications.

12 Claims, No Drawings

ELECTROLYTIC PURIFICATION OF CALCIUM CARBONATE

FIELD OF THE INVENTION

The present invention relates to a product and a process for its preparation. More particularly, the present invention relates to a process for purifying calcium carbonate by removing metal contaminants. Even more particularly, the present invention relates to a process for lowering metal contaminants in calcium carbonate products by electrochemically treating the precursors that are subsequently used for producing calcium carbonate.

BACKGROUND OF INVENTION

Many limestone quarries contain some level of metal contaminants, such as iron, aluminum, magnesium, manganese, lead and tin in the calcium carbonate. The metal contaminants are usually in the form of oxides. For example, the presence of iron, in any form, is considered a contaminant in specialty markets, such as food products and pharmaceutical applications. Furthermore, the presence of other metal contaminants in calcium carbonate diminishes the economic value of products, such as paper, plastics, and paints that are produced containing these metal contaminants.

Several physical and chemical processes have been suggested to remove iron from calcium carbonate. Physical removal typically requires grinding the calcium carbonate to such fineness so that the iron can be removed by screening, classification, magnetic separation or floatation. Chemical removal typically requires leaching or bleaching the ground calcium carbonate with solvents followed by filtration. However, these physical and chemical processes for the removal of iron from calcium carbonate are complex, difficult to apply, and the results are erratic and unreliable. There is a need for reliable ways to remove iron and other metal contaminants from calcium carbonate.

The use of electrolytic techniques to remove metal contaminants such as lead and other metals is described in a number of systems. Acar Y. B., "J of Geo-technical Engineering," Vol. 122 No. 3, pps. 175–185, describes an electrolytic technique for the removal of metal contaminants from soil. Dudek F. J.; Morgan, W. A. International Symposium on the Extraction and Applications of Zinc and Lead, Sendai, Japan, May 22–24, 1995, describes an electrolytic technique for reclaiming zinc from steel scrap. Flett D. S.; Covington, J. W.; Winter, D. G.; Spring 1988 Proceedings of the Electrochemical Society Meeting, Volume 88-1, describes a method for removing lead contaminants from zinc solutions. All these techniques describe electrolysis as a method for purifying various systems but none describes using this technique for purifying calcium carbonate.

U.S. Pat. No. 5,690,897 describes a method of lowering the iron content of calcium carbonate by using chelating agents. Mahanti, H. S., Barnes, R. M., "Application Spectroscopy," 1983, Vol.37,155.4, and as Golley, C. R. L. and European Patent Application 88304211 describes, purification through the use of floatation. All these techniques provide processes for purifying calcium carbonate. However, none of the techniques make use of the electrolytic process of the present invention.

What has been found to be novel and unanticipated by the prior art is an electrolytic process for reducing the metal contaminants in calcium carbonate, including the reduction of metal contaminants in precursors that are subsequently used in calcium carbonate production.

It is therefore an object of the present invention to provide a process for the removal of metal contaminants from calcium carbonate. Another object of the present invention is to provide a process for the removal of metal contaminants from precursors that are subsequently used in the production of calcium products. Still a further object of the present invention is to provide calcium carbonate products that are free of metal contaminants. Still another object of the present invention is to produce calcium carbonate products that are of sufficient purity such that they find particularly use in market applications where purity of the final product is required.

SUMMARY OF INVENTION

The present invention provides an electrochemical process for reducing metal contaminants in calcium carbonate materials by solubilizing the calcium carbonate material containing the metal contaminant in an aqueous solution and then removing the metal contaminant by passing an electrical current through the aqueous solution containing the solubilized metal contaminant to produce a high purity calcium carbonate product.

In another aspect of the present invention, an electrochemical process is used to treat any calcium carbonate precursors that are subsequently used in the production of calcium carbonate products having lower metal contaminants.

Calcium carbonate produced according to the process of this invention is particularly suitable for use as food or pharmaceutical additives. The calcium carbonate is also suitable for use in papermaking process as fillers, or coatings, or as additives in the production of plastics, paints, adhesive products, or any other application where high purity calcium carbonate products are required.

DETAIL DESCRIPTION OF THE INVENTION

In one aspect, the present invention provides an electrochemical process for removing metal contaminants such as, for example, iron, aluminum, magnesium, manganese, lead, and tin and the like, from calcium carbonate. The metal content of the final product was substantially reduced, and in some instances, complete extraction of the contaminant occurred.

In another aspect of the present invention, an electrochemical process was used to lower metal contaminants in chemical species that are used as precursors for the subsequent production of calcium carbonate. The electrochemical process of the present invention may be used for reducing metal contaminants in calcium carbonate products that are destined for use in USP grade products, food grade products, and in paper products as fillers and coatings, and in the production of plastics, paints and adhesive products. Uses of high purity calcium carbonate include, but not limited to, catalysts and catalyst supports, electrical/semiconductor applications, florescent lighting, and optical/laser applications.

The electrochemical process of the present invention is useful in lowering the metal contaminants in calcium carbonate minerals, such as, for example, limestone, chalk, dolomite and synthetically produced precipitated calcium carbonate (PCC). Additionally, the process is also applicable to the treatment of chemical species that are used as precursors from which calcium carbonate products are produced.

The electrochemical process for removing metal contaminants from calcium carbonate is applicable during the production of calcium carbonate. The process may be practiced during the slaking stage, during the carbonation stage or during the heat aging stages to produce high purity calcium carbonate products.

In order to practice the electrochemical process during the slaking operation, all chemical species, such as, the calcium ions, the carbonate ions and other metal ions are preferably in a uniformly dispersed solution. A uniformly dispersed solution is one having no particulate matter present prior to the precipitation of calcium carbonate. The uniformly dispersed solution is prepared by dissolving enough calcium oxide (lime) into water to produce from about zero 0 weight percent to about 2.0 weight percent calcium hydroxide solution, based on the weight of the calcium hydroxide solution. The preferred weight of the calcium hydroxide is from about 0.11 weight percent to about 1.5 weight percent calcium hydroxide solution, based on the weight of the calcium hydroxide solution. Before carbonating the calcium hydroxide, an electrical current of from about zero 0 volts to about 10 volts is passed through the calcium hydroxide solution to remove metal contaminants. The preferred voltage is from about 3 volts to about 7 volts. The subsequent carbonation of the calcium hydroxide produces the high purity calcium carbonate product of the present invention.

In order to practice the electrochemical process during the carbonation operation, all chemical species, such as, the calcium ions, the carbonate ions and other metal ions are preferably in a uniformly dispersed solution. A uniformly dispersed solution is one having no particulate matter present prior to the precipitation of calcium carbonate. The uniformly dispersed solution is prepared by dissolving enough calcium oxide (lime) into water to product from about 0 weight percent to about 2.0 weight percent calcium hydroxide solution, based on the weight of the calcium hydroxide. The preferred weight of the calcium hydroxide is from about 0.11 weight percent to about 1.5 weight percent calcium hydroxide solution, based on the weight of the calcium hydroxide. While carbonating the calcium hydroxide, an electrical current of from about 0 volts to about 5 volts are passed through the calcium hydroxide solution to remove metal contaminants. The preferred voltage is from about 0 volts to about 3 volts. The subsequent carbonation of the calcium hydroxide produces the high purity calcium carbonate product of the present invention.

The electrolytic process is also applicable to any chemical species that is a calcium carbonate precursor. This includes, any calcium containing species that can be converted to calcium carbonate, such as, for example, calcium hydroxide or any soluble calcium salt, such as, for example, calcium chloride, calcium bromide, calcium iodide, calcium nitrate, calcium sulfate, calcium acetate, calcium citrate, calcium borate, calcium dihydrogen phosphate, calcium hydrogen phosphate, calcium lactate, and the like. This also includes treatment of any soluble carbonate species that serves to provide the carbonate part of calcium carbonate, such as, for example, sodium carbonate, ammonium carbonate, lithium carbonate, potassium carbonate, magnesium carbonate, aluminum carbonate, sodium bicarbonate, and the like. An electrochemical process is used where electrical energy is used to promote chemical reactions at two electrodes. At the anode, an oxidation process occurs in which a substance loses electrons while at the cathode, a reduction reaction takes place in which a substance gains electrons. The two processes occur simultaneously. Therefore, various elements from among the active metals, transition metals, and non-metals group can be "plated" onto the electrode.

Sufficient electric potential (volts) is applied across the electrodes for a period of time to remove any element that is reducible in an aqueous media. This includes any element in the periodic table. The potential applied across the electrode can range from about zero 0 volts to about 20 volts, with the preferred voltage in the range of from about zero 0 to about 7 volts. The temperature of the cell can range from about zero 0 degrees Centigrade (C) to about 100° C. The electrolytic treatment periods can vary, depending upon the contaminating species, its concentration, the precursor material being treated, and the voltage being applied. For most precursor materials, treatment times will vary from about zero 0 hours to about 48 hours, with one to eight hour treatment periods being typical.

TEST METHODS AND PROCEDURES

Equipment

1. Eberback Electro-analysis Apparatus

This is an electrolytic cell. The cell uses an electrochemical process by which electrical energy is used to promote chemical reactions at two electrodes. At the anode, an oxidation process occurs in which a substance loses electrons while at the cathode; a reduction reaction takes place in which a substance gains electrons. The two processes occur simultaneously. Therefore, various elements from among the active metals, transition metals, and non-metals groups can be "plated" onto the electrode. It is through these principles that Michael Faraday developed electrolysis (see CRC Handbook of Chemistry and Physics, 69th Edition 1988–1989, page F-81). Faraday's principle is that, if a current, i, flows for a time, t, and deposits a metal whose electrochemical equivalent is e, the mass, m, deposited is, $$m = eit$$

This allows for quantitative measurement of the metal.

2. Inductively Coupled Plasma Analysis (ICP)

This is an elemental analysis technique using a high temperature (7000–8000 Kelvin) excitation source that efficiently desolvates, vaporizes, excites, and ionizes atoms. ICP sources are used to excite atoms for atomic-emission spectroscopy and to ionize atoms for mass spectroscopy. The two methods allow for elemental analysis in the parts per billion (ppb) range and was used to analyze for trace elements, such as, lead, aluminum, iron, magnesium, manganese, and tin, found in the calcium and carbonate products in Example 1 through Example 6.

3. Atomic Absorption Analysis

This is an analytical technique in which the substance to be analyzed is converted to an atomic vapor by spraying a solution into an acetylene-air flame. The absorbance at a selected wavelength is measured and compared with that of a reference substance. The absorbance measured is proportional to the concentration (Hawley's Condensed Chemical Dictionary, $12^{th}$ Edition 1993, page 104). This technique provides the elemental composition, in parts per billion, of the sample allowing for the quantification of the elements. This technique was used in Example 1 through Example 5 to measure the concentration of lead in the samples.

4. Micromeritics Sedigraph 5100 Analyzer

An instrument for measuring particle size distributions using Stokes law (see CRC Handbook of Chemistry and Physics, $69^{th}$ Edition 1988–1989, page F-105). This gives the rate of fall of a small sphere in a viscous fluid. From this, particle size distributions on a mass (weight) basis is determined.

5. Micromeritics Flowsorb 2300

Is a multi-point surface area analyzer. This determines the quantity of a gas that adsorbs as a single layer of molecules (monomolecular layer) on a sample. Under specific conditions, the area covered by each gas molecule is known within relatively narrow limits. The surface area of the sample is thus directly calculable from the number of adsorbed molecules, which is derived from the gas quantity at the prescribed conditions, and the area occupied by each. From this the specific surface area (SSA) of the sample is determined in $m^2/g$.

DEFINITION OF TERMS

Slake

This is the addition of calcium oxide (CaO) to water ($H_2O$) to produce calcium hydroxide slurry ($Ca(OH)_2$). Normal slake concentrations are ten percent based on the dry weight of $Ca(OH)_2$.

$$CaO + H_2O \rightarrow Ca(OH)_2 \quad \text{Equation (1)}$$

Carbonation

This is a method of injecting $CO_2$ into a calcium hydroxide slurry to produce a calcium carbonate ($CaCO_3$) slurry, Equation (2). Another way to produce $CaCO_3$ is to combine calcium chloride and sodium carbonate solutions. The solutions react and calcium carbonate and sodium chloride are produced, Equation (3). The calcium carbonate precipitates out of solution while the sodium chloride does not.

$$Ca(OH)_2 + C_2O \rightarrow CaCO_3 + H_2O \quad \text{Equation (2)}$$

$$CaCl_2 + Na_2CO_3 \rightarrow CaCO_3 + 2NaCl \quad \text{Equation (3)}$$

Calcite

This is one of the crystal phases in which natural calcium carbonate is found. Calcite can be produced using either of the procedures described in Equation (2) or (3). Calcite can be produced with any number of different morphologies and physical properties dependent upon the conditions used to produce it.

Aragonite

This is one of the forms natural $CaCO_3$ is found. This type of $CaCO_3$ is not as stable as calcite and under certain conditions is transformed into calcite. Controlling carbonation parameters described in Equation (2) above produces aragonite. As with the calcite, aragonite's physical characteristics can be altered by controlling carbonation conditions.

Heat Aging

This is a process of taking $CaCO_3$ slurry, elevating the temperature to 70° C. to 75° C. and holding the temperature for a certain length of time. This is done to modify the crystal morphology or phase of the calcium carbonate.

Lime Water

This is a 0.11 percent calcium hydroxide solution based on calcium hydroxide. This was the highest calcium hydroxide concentration achieved before precipitating out of solution.

Sugar Lime Water

Is a uniformly dispersed solution of 10 weight percent sucrose and 1.5 weight percent calcium hydroxide. The sucrose increased the solubility of the lime allowing for a higher concentration of calcium hydroxide before precipitating out of solution.

Electrolytic Treatment

An electrolytic cell is used in which a basket electrode (cathode) and coil electrode (anode) are positioned in the cell with a glass stirrer between them. Calcium carbonate slurry or the precursor solutions for making $CaCO_3$ is placed into the electrolytic cell. A variable current is applied to the bath to initiate a reaction at the electrodes.

EXAMPLES

The present invention involves the use of an electrolytic technique for the purification of calcium carbonate. In general, this technique utilizes an electric current that is passed through a solution to remove metal contaminants by depositing such onto an electrode. The removal of these metal contaminants results in high purity calcium carbonate. This technique has successfully removed iron and other metal contaminants from calcium carbonate. Typically, the higher voltage across the cell, the more metal contaminants are removed.

The following examples are intended to be illustrative of the present invention and are not proffered, in any manner whatsoever, to limit the scope of the present invention which is more specifically defined by the appended claims.

The Eberback Electro-analysis apparatus is used for Example 1 through Example 6. The cell is driven by an electrical source to produce the current needed for reducing metals that are found in calcium carbonate materials. In Example 1 through Example 6, atomic adsorption and/or ICP analysis was performed to determine if any trace elements were removed from the $CaCO_3$ and if so, the amount removed.

Example 1

Electrolytic Treatment of Slake

Calcium oxide (lime) and water were mixed together to form a calcium hydroxide slurry (slake) solution. A 10 percent (dry wt.) calcium hydroxide slurry, a 0.11 percent soluble calcium hydroxide solution (lime water) based on calcium hydroxide, and a solution of 1.5 weight percent calcium hydroxide and 10 weight percent sucrose (sugar lime water), based on total volume, was electrolytically treated.

After electrolytic treatment, the solution was carbonated and the PCC produced was analyzed. The results are presented in Table 1.

TABLE 1

ELECTROLYTIC TREATMENT OF SLAKE

| Sample | LEAD CONTENT OF PCC (ppb) Cell Voltage | |
|---|---|---|
| | 0 | 3 |
| 10% Slake | 343 | 338[a] |
| 0.11% Lime water | 578 | 199[b] |
| 1.5% Sugar lime water | 480 | 187 |

Legend:
[a]Electrolytic treatment for 4 hours at 3 volts.
[b]Electrolytic treatment for 24 hours at 3 volts.

Electrolytic treatment of 10 percent calcium hydroxide slurry did not lower the lead content of the subsequently produced PCC. Precipitated calcium carbonate produced from the lime water and sugar lime water did produce PCC products with reduced lead levels.

Example 2

Electrolytic Treatment during Carbonation

Electrolytic treatment was applied to a 10 weight percent slake sample and a sample of sugar lime water. Both samples were carbonated for six hours using a cell potential of three volts. The results are shown below:

TABLE 2

ELECTROLYTIC TREATMENT[a] DURING CARBONATION

| Sample | PCC LEAD CONTENT (ppb) Cell Voltage | |
|---|---|---|
| | 0 | 3 |
| 10% Slake | 480 | 251 |
| 1.5% Sugar lime water | 428 | 226 |

Legend:
[a]Treatment time of six hours.

Electrolytic treatment of 10 percent calcium hydroxide slurry during carbonation did lower the lead content of the subsequently produced PCC. The PCC produced from the sugar lime water also produce PCC products with reduced lead levels.

Example 3

The Effect of Cell Potential on Lead Removal

Lime water samples were placed into the electrolytic cell. These samples were electrolytically treated for six hours with cell potentials between zero and seven volts. Samples containing both high and low levels of lead were electrolytically treated. The results are shown in the table below.

TABLE 3

EFFECT OF CELL POTENTIAL[a] ON LEAD REMOVAL

| Cell Potential, Volts | PCC LEAD CONTENT (ppb) SAMPLE TYPE | |
|---|---|---|
| | High Lead | Low Lead |
| 0 | 1500 | 263 |
| 3 | 1000 | 119 |
| 5 | 107 | 59 |
| 7 | 112 | — |

Legend:
[a]Electrolytic treatment time was six hours.

Lead can be removed with a cell potential of 3 volts or less regardless of the initial levels the PCC. A cell potential of 5 volts is the most effective at removing lead from PCCs levels of contamination.

Example 4

Electrolytic Treatment of Calcium Chloride and Sodium Carbonate

Calcium chloride and sodium carbonate solutions where used as the source of metal and carbonate ions. Before combining the precursors to make PCC, both were electrolytically treated. The subsequent PCC produced from these precursors was analyzed for trace metal.

TABLE 4

ELECTROLYTIC TREATMENT OF CALCIUM CHLORIDE AND SODIUM CARBONATE PRECURSORS

| Run # | Cell Potential of Each Solution[a] | | Lead Content of PCC from Precursors (ppb) |
|---|---|---|---|
| | $CaCl_2$[b] | $Na_2CO_3$[c] | |
| 1 | 0 | 0 | >1000 |
| 2 | 0 | 5 | >1000 |
| 3 | 5 | 0 | 500 |
| 4 | 3 | 3 | 252 |
| 5 | 5 | 5 | 171 |

Legend:
[a]Solutions were electrolytically treated six hours.
[b]One mole (111 grams $CaCl_2$) per liter solution.
[c]One mole (106 grams $Na_2CO_3$) per liter solution.

Electrolytic treatment of the $CaCl_2$ precursor alone lowered the lead content by over half (Run #3). Electrolytic treatment of both precursor solutions was the most effective way of removing lead from the subsequently produced PCC (Run #4 and #5). Electrolytically treating each precursor solution using a cell potential of 5 volts removed the most lead (Run #5).

Example 5

Electrolytic Treatment to Remove other Metal Contaminants

Using the same procedure as Example 4, elemental analysis was done on the calcium chloride and sodium carbonate solutions before and after electrolytic treatment to determine whether this technique could remove metal contaminants other than lead. The results are listed in Table 5.

TABLE 5

ELECTROLYTIC TREATMENT[a] TO REMOVE OTHER METAL CONTAMINANTS

| | CONCENTRATION OF METALS (parts per million) | |
|---|---|---|
| ELEMENT | Without Treatment | With Treatment |
| Al | 61 | 0 |
| Fe | 511 | 16 |
| Mg | 1310 | 98 |
| Mn | 24 | 0 |
| Pb | 1 | 0.171 |
| Sn | 30 | 0 |

Legend:
[a]Electrolytic treatment was at five volts for six hours.

In addition to removing lead, substantial amounts of aluminum, iron, magnesium, manganese, and tin are removed by the process of the present invention.

I claim:

1. An electrochemical process for reducing metal contaminants in calcium carbonate materials by solubilizing the calcium carbonate material having the metal contaminant in an aqueous solution and then removing the metal contaminant by passing an electrical current through the aqueous solution containing the solubilized metal contaminant to produce a high purity calcium carbonate product.

2. The process according to claim 1 wherein the aqueous solution is calcium hydroxide.

3. The process according to claim 2 wherein the calcium hydroxide is prepared by dissolving calcium oxide in water to produce from about 0 weight percent to about 2 weight percent calcium hydroxide solution.

4. The process according to claim 3 wherein the calcium hydroxide solution is prepared by dissolving calcium oxide into water to produce from about 0.11 weight percent to about 1.5 weight percent calcium hydroxide solution.

5. The process according to claim 1 wherein the electrical current is from about 0 volts to about 10 volts.

6. The process according to claim 5 wherein the electrical current is from about 3 volts to about 7 volts.

7. An electrochemical process for producing a calcium carbonate, said process comprising (a) solubilizing a calcium-containing species having a metal contaminant, or (b) solubilizing a carbonate-containing species having a metal contaminate or, (c) both (a) and (b), and then removing said solubilized metal contaminant by passing an electrical current through the solubilized metal contaminant; and then reacting said calcium-containing species or said carbonate-containing species or both to produce said calcium carbonate.

8. The process according to claim 7 wherein the calcium-containing species is calcium chloride and the carbonate-containing species is sodium carbonate.

9. The process according to claim 8 wherein the electrical current of from about 0 volts to about 10 volts is passed through the calcium chloride and the sodium carbonate solution.

10. The process according to claim 9 wherein the electrical current of from about 3 volts to about 7 volts is passed through the calcium chloride and the sodium carbonate solution.

11. The process of claim 8 wherein the carbonate-containing species is selected from the group consisting of sodium carbonate, ammonium carbonate, lithium carbonate, potassium carbonate, magnesium carbonate, aluminum carbonate and sodium bicarbonate.

12. The process of claim 7 wherein the calcium-containing species is selected from the group consisting of calcium hydroxide, calcium chloride, calcium bromide, calcium iodide, calcium nitrate, calcium sulfate, calcium acetate, calcium citrate, calcium borate, calcium dihydrogen phosphate, calcium hydrogen phosphate and calcium lactate.

\* \* \* \* \*